US008594846B2

(12) United States Patent
Nakadai et al.

(10) Patent No.: US 8,594,846 B2
(45) Date of Patent: Nov. 26, 2013

(54) BEAT TRACKING APPARATUS, BEAT TRACKING METHOD, RECORDING MEDIUM, BEAT TRACKING PROGRAM, AND ROBOT

(75) Inventors: Kazuhiro Nakadai, Wako (JP); Yuji Hasegawa, Wako (JP); Hiroshi Tsujino, Wako (JP); Kazumasa Murata, Tokyo (JP); Ryu Takeda, Kyoto (JP); Hiroshi Okuno, Kyoto (JP)

(73) Assignee: Honda Motor Co., Ltd., Tokyo (JP)

( * ) Notice: Subject to any disclaimer, the term of this patent is extended or adjusted under 35 U.S.C. 154(b) by 773 days.

(21) Appl. No.: 12/503,431

(22) Filed: Jul. 15, 2009

(65) Prior Publication Data

US 2010/0017034 A1 Jan. 21, 2010

Related U.S. Application Data

(60) Provisional application No. 61/081,057, filed on Jul. 16, 2008.

(51) Int. Cl.
*G05B 15/00* (2006.01)
*G05B 19/00* (2006.01)

(52) U.S. Cl.
USPC .......................................... 700/258; 700/246

(58) Field of Classification Search
USPC ............. 700/258, 246; 84/611, 612, 651, 652
See application file for complete search history.

(56) References Cited

U.S. PATENT DOCUMENTS

| | | | | |
|---|---|---|---|---|
| 7,050,980 | B2 * | 5/2006 | Wang et al. | 704/503 |
| 7,534,951 | B2 * | 5/2009 | Yamashita | 84/611 |
| 7,584,218 | B2 * | 9/2009 | Miyajima et al. | 1/1 |
| 7,592,534 | B2 * | 9/2009 | Yoshikawa et al. | 84/612 |
| 2007/0022867 | A1 * | 2/2007 | Yamashita | 84/612 |
| 2008/0115656 | A1 * | 5/2008 | Sumita | 84/612 |
| 2009/0056526 | A1 * | 3/2009 | Yamashita et al. | 84/611 |
| 2010/0011939 | A1 | 1/2010 | Nakadai et al. | |
| 2010/0017034 | A1 | 1/2010 | Nakadai et al. | |

FOREIGN PATENT DOCUMENTS

| | | |
|---|---|---|
| JP | 11-282483 | 10/1999 |
| JP | 2000-316851 | 11/2000 |
| JP | 2002-116754 | 4/2002 |
| JP | 2005-292207 | 10/2005 |

(Continued)

OTHER PUBLICATIONS

Kanbara, Hiroyuki et al., "Speed Improvement of AES Encryption using hardware accelerators synthesized by C Compatible Architecture Prototyper (CCAP," SASIMI 2007 Proceedings, pp. 7-12 (2007).

(Continued)

*Primary Examiner* — Khoi Tran
*Assistant Examiner* — Jorge Peche
(74) *Attorney, Agent, or Firm* — Nelson Mullins Riley & Scarborough LLP; Anthony A. Laurentano

(57) ABSTRACT

A beat tracking apparatus includes: a filtering unit configured to perform a filtering process on an input acoustic signal and to accentuate an onset; a beat interval reliability calculating unit configured to perform a time-frequency pattern matching process employing a mutual correlation function on the acoustic signal of which the onset is accentuated and to calculate a beat interval reliability; and a beat interval estimating unit configured to estimate a beat interval on the basis of the calculated beat interval reliability.

9 Claims, 12 Drawing Sheets

SB-ICA UNIT: SEMI-BLIND INDEPENDENT COMPONENT ANALYSIS UNIT
STPM UNIT: TIME-FREQUENCY PATTERN MATCHING UNIT

(56) References Cited

FOREIGN PATENT DOCUMENTS

| | | |
|---|---|---|
| JP | 2007-4071 | 1/2007 |
| JP | 2007-33851 | 2/2007 |
| JP | 2007-199306 | 8/2007 |
| JP | 2007-241157 | 9/2007 |
| JP | 2008-40284 | 2/2008 |
| JP | 2010-26513 | 2/2010 |

OTHER PUBLICATIONS

Japanese Office Action for Application No. 2009-166048, 6 pages, dated Nov. 13, 2012.

Japanese Notice of Allowance for Application No. 2009-166049, 6 pages, dated Nov. 6, 2012.

Asoh, Hideki et al., "Socially Embedded Learning of the Office-Conversant Mobile Robot Jijo-2," Proceedings of the 15th International Conference on Artificial Intelligence, vol. 1:880-885 (1997).

Aucouturier, Jean-Julien, "Cheek to Chip: Dancing Robots and AI's Future," IEEE Intelligent Systems, vol. 23(2):74-84 (2008).

Cemgil, Ali Taylan et al., "Monte Carlo Methods for Tempo Tracking and Rhythm Quantization," Journal of Artificial Intelligence Research, vol. 18:45-81 (2003).

Goto, Masataka, "An Audio-based Real-time Beat Tracking System for Music With or Without Drum-sounds," Journal of New Music Research, vol. 30(2):159-171 (2001).

Goto, Masataka et al., "A Real-time Beat Tracking System for Audio Signals," Proceedings of the International Computer Music Conference, pp. 13-20 (1996).

Goto, Masataka et al., "RWC Music Database: Popular, Classical, and Jazz Music Databases," Proceedings of the Third International Conference Music Information Retrieval (2002).

Gouyon, Fabien et al., "An experimental comparison of audio tempo induction algorithms," IEEE Transactions on Audio, Speech and Language Processing, vol. 14(5):1832-1844 (2006).

Hara, Isao et al., "Robust Speech Interface Based on Audio and Video Information Fusion for Humanoid HRP-2," Proceedings of the 2004 IEEE/RSJ International Conference on Intelligent Robots and Systems, vol. 3:2404-2410 (2004).

Jensen, Kristoffer et al., "Real-time beat estimation using feature extraction," Proceedings of Computer Music Modeling and Retrieval Symposium, Lecture Notes in Computer Science (2003).

Kirovski, Darko et al., "Beat-ID: Identifying Music via Beat Analysis," IEEE Workshop on Multimedia Signal Processing, pp. 190-193 (2002).

Klapuri, Anssi P. et al., "Analysis of the Meter of Acoustic Musical Signals," IEEE Transactions on Audio, Speech, and Language Processing, vol. 14(1):342-355 (2006).

Kotosaka, Shin'ya et al., "Synchronized Robot Drumming with Neural Oscillators," Proceedings of the International Symposium of Adaptive Motion of Animals and Machines, (2000).

Kurozumi, Takayuki et al., "A Robust Audio Searching Method for Cellular-Phone-Based Music Information Retrieval," Proceedings of the International Conference on Pattern Recognition, vol. 3:991-994 (2002).

Matsusaka, Yosuke et al., "Multi-person Conversation via Multi-modal Interface—A Robot who Communicate with Multi-user," Sixth European Conference on Speech Communication and Technology, EUROSPEECH'99 (1999).

Mavridis, Nikolaos et al., "Grounded Situation Models for Robots: Where words and percepts meet," Proceedings of IEEE/RSJ International Conference on Intelligent Robots and Systems (IROS 2006), IEEE (2006).

Michalowski, Marek P. et al., "A Dancing Robot for Rhythmic Social Interaction," Proceedings of ACM/IEEE International Conference on Human-Robot Interaction (HRI 2007), IEEE (2007).

Nakadai, Kazuhiro et al., "Active Audition for Humanoid," AAI-00 Proceedings (2000).

Nakano, Mikio et al., "A Two-Layer Model for Behavior and Dialogue Planning in Conversational Service Robots," Proceedings of IEEE/RSJ International Conference on Intelligent Robots and Systems (IROS-2005) (2005).

Nakazawa, Atsushi et al., "Imitating Human Dance Motions through Motion Structure Analysis," Proceedings of the 2002 IEEE/RSJ International Conference on Intelligent Robots and Systems (2002).

Takeda, Ryu et al., "Exploiting Known Sound Source Signals to Improve ICA-based Robot Audition in Speech Separation and Recognition," Proceedings of the 2007 IEEE/RSJ International Conference on Intelligent Robots and Systems (2007).

Takeda, Takahiro et al., "HMM-based Error Detection of Dance Step Selection for Dance Partner Robot—MS DanceR-," Proceedings of the 2006 IEEE/RSJ International Conference on Intelligent Robots and Systems (2006).

Yamamoto, Shun'ichi et al., "Real-Time Robot Audition System That Recognizes Simultaneous Speech in the Real World," Proceedings of the 2006 IEEE/RSJ International Conference on Intelligent Robots and Systems (2006).

Yoshii, Kazuyoshi et al., "A Biped Robot that Keeps Step in Time with Musical Beats while Listening to Music with Its Own Ears," Proceedings of the 2007 IEEE/RSJ International Conference on Intelligent Robots and Systems (2007).

Cemgil, Ali Taylan et al., "Monte Carlo Methods for Tempo Tracking and Rhythm Quantization," Journal of Artificial Intelligence Research, pp. 1-34 (2002).

* cited by examiner

FIG. 2

```
EstimationBeatInterval(I1(t), I2(t))

 Ic(t)←I1(t)
 if αRpeak(t, I1) < Rpeak(t, I2)
       ┌ Id(t)← | I1(t)−I2(t) |
       │ for n←2 to Nmax
 then ┤          ┌ if | I1(t)−nId(t) | < δ  or  | I2(t)−nId(t) | < δ
       │      do ┤        ┌ Ic(t)←nId(t)
       │          │ then ┤
       └          └       └ break

I(t)←EstimationBeatInterval(Ic(t), I(t−1))
return(I(t))
```

FIG. 3

```
EstimationBeatTime(t, T(n), S(t), I(t))

  procedure SearchPeaks(S(t), t, tr, Nmax)
       search Nmax peaks in S(t) within t±1/2·tr
  comment: t[i] is an array of peak times.
       Np is the size of the array.
  return(t[i], Np)

  main
   T(n+1)←nil
   if t>T(n)+3/4·I(t)
        ┌ (t[i], Np)←SearchPeaks(S(t), T(n), I(t), 3)
        │ if Np>0
   then ┤        ┌ imin←argmin( | T(n)+I(t)−t[i] | )
        │  then ┤                  i
        │        └ T(n+1)←t[imin]
        └ else     T(n+1)←T(n)+I(t)
   return(T(n+1))
```

FIG. 7

70

MUSIC ID TABLE

| TEMPO | MUSIC ID |
|---|---|
| 60M. M. | ID001 |
| 70M. M. | ID002 |
| 80M. M. | ID003 |
| ⋮ | ⋮ |
| 120M. M. | ID007 |
| Unknown | IDunknown |

FIG. 11

AVERAGE DELAY TIME FROM TEMPO VARIATION (UNIT: sec)

| POWER OF ROBOT | OFF | | ON (STEP IN PLACE) | | |
|---|---|---|---|---|---|
| SELF VOCALIZATION | NONE | SCAT | NONE | SCAT | SINGING |
| STPM PROCESS | 1. 31 | 1. 31 | 1. 29 | 1. 29 | 1. 29 |
| SELF CORRELATION PROCESS | 11. 24 | 29. 91 | 14. 66 | 20. 43 | N/A |

FIG. 13

SUCCESS RATE OF BEAT PREDICTION (UNIT: %)

| POWER OF ROBOT | OFF | | | ON (SETP IN PLACE) | |
|---|---|---|---|---|---|
| SELF VOCALIZATION | NONE | SCAT | | SCAT | |
| REGULATION OF SELF-VOCALIZED SOUND | — | DONE | NONE | DONE | NONE |
| SUCCESS RATE | 73 | 76 | 54 | 77 | 54 |
| UPBEAT PREDICTION RATE | 3 | 1 | 22 | 2 | 28 |

BEAT TRACKING APPARATUS, BEAT TRACKING METHOD, RECORDING MEDIUM, BEAT TRACKING PROGRAM, AND ROBOT

CROSS REFERENCE TO RELATED APPLICATIONS

This application claims benefit from U.S. Provisional application Ser. No. 61/081,057, filed Jul. 16, 2008, the contents of which are incorporated herein by reference.

BACKGROUND OF THE INVENTION

1. Field of the Invention

The present invention relates to a beat tracking technique of estimating tempos and beat times from acoustic information including beat, such as music or scat, and a technique for a robot interacting musically using the beat tracking technique.

2. Description of Related Art

In recent years, robots such as humanoids or home robots interacting socially with human beings were actively studied. It is important to undertake a study of musical interaction where the robot is allowed to listen to music on its own, move its body, or sing along with the music in order for the robot to achieve natural and rich expressions. In this technical field, for example, a technique is known for extracting beats from live music which has been collected with a microphone in real time and making a robot dance in synchronization with these beats (see, for example, Unexamined Japanese Patent Application, First Publication No. 2007-33851).

When the robot is made to listen to music and is made to move to the rhythm of the music, a tempo needs to be estimated from the acoustic information of the music. In the past, the tempo was estimated by calculating a self correlation function based on the acoustic information (see, for example, Unexamined Japanese Patent Application, First Publication Nos. 2007-33851 and 2002-116754).

However, when a robot listening to the music extracts beats from the acoustic information of the music and estimates the tempo, there are roughly two technical problems to be solved. The first problem is the guaranteeing of robustness with respect to noises. A sound collector, such as a microphone, needs to be mounted to make a robot listen to the music. In consideration of the visual quality in the appearance of the robot, it is preferable that the sound collector be built in the robot body.

This leads to the problem that the sounds collected by the sound collector include various noises. That is, the sounds collected by the sound collector include environmental sounds generated in the vicinity of the robot and sounds generated from the robot itself as noises. Examples of the sounds generated from the robot itself are the robot's footsteps, operation sounds coming from a motor operating inside the robot body, and self-vocalized sounds. Particularly, the self-vocalized sounds serve as noises with an input level higher than the environmental sounds, because a speaker as a voice source is disposed relatively close to the sound collector. In this way, when the S/N ratio of the acoustic signal of the collected music deteriorates, the degree of precision at which the beats are extracted from the acoustic signal is lowered and the degree of precision for estimating a tempo is also lowered as a result.

Particularly, in operations which are required for the robot to achieve an interaction with the music, such as making a robot sing or phonate to the collected music sound, the beats of the collected self-vocalized sound as noise have periodicity, which has a bad influence on a tempo estimating operation of the robot.

The second problem is the guaranteeing of tempo variation following ability (adaptability) and stability in tempo estimation. For example, the tempo of the music performed or sung by a human being is not always constant, and typically varies in the middle of a piece of music depending on the musical performer or the singer's skill, or on the melody of the music. When a robot is made to listen to music having a non-constant tempo and is made to act in synchronization with the beats of the music, high tempo variation following ability is required. On the other hand, when the tempo is relatively constant, it is preferable that the tempo be stably estimated. In general, to stably estimate the tempo with a self correlation calculation, it is preferable that a large time window used in the tempo estimating process be set, however the tempo variation following ability tends to deteriorate instead. That is, a trade-off relationship exists between guaranteeing of tempo variation following ability and guaranteeing of stability in tempo estimation. However, in the music interaction of the robot, both abilities need to be excellent.

Here, considering the relation of the first and second problems, it is necessary to guarantee stability in tempo estimation as a portion of the second problem so as to guarantee robustness with respect to noises as the first problem. However, in this case, a problem exists in that it is difficult to guarantee tempo variation following ability as the other portion of the second problem.

Unexamined Japanese Patent Application, First Publication Nos. 2007-33851 and 2002-116754 do not clearly disclose or teach the first problem at all. In the known techniques including Unexamined Japanese Patent Application, First Publication Nos. 2007-33851 and 2002-116754, self correlation in the time direction in the tempo estimating process is required and the tempo variation following ability deteriorates when a wide time window is set in order to guarantee stability in tempo estimation, thereby not dealing with the second problem.

SUMMARY OF THE INVENTION

The invention is conceived of in view of the above-mentioned problems. An object of the invention is to provide a beat tracking apparatus, a beat tracking method, a recording medium, a beat tracking program, and a robot, which can guarantee robustness with respect to noises and guarantee tempo variation following ability and stability in tempo estimation.

According to an aspect of the invention, there is provided a beat tracking apparatus (e.g., the real-time beat tracking apparatus 1 in an embodiment) including: a filtering unit (e.g., the Sobel filter unit 21 in an embodiment) configured to perform a filtering process on an input acoustic signal and accentuating an onset; a beat interval reliability calculating unit (e.g., the time-frequency pattern matching unit 22 in an embodiment) configured to perform a time-frequency pattern matching process employing a mutual correlation function on the acoustic signal of which the onset is accentuated and to calculate a beat interval reliability; and a beat interval estimating unit (e.g., the beat interval estimator 23 in an embodiment) configured to estimate a beat interval (e.g., the tempo TP in an embodiment) on the basis of the calculated beat interval reliability.

In the beat tracking apparatus, the filtering unit may be a Sobel filter.

The beat tracking apparatus may further include: a beat time reliability calculating unit (e.g., the adjacent beat reliability calculator 31, the successive beat reliability calculator 32, and the beat time reliability calculator 33 in an embodiment) configured to calculate a beat time reliability on the basis of the acoustic signal of which the onset is accentuated by the filtering unit and the beat interval estimated by the beat interval estimating unit; and a beat time estimating unit (e.g., the beat time estimator 34 in an embodiment) configured to estimate a beat time (e.g., the beat time BT in an embodiment) on basis of the calculated beat time reliability.

In the beat tracking apparatus, the beat time reliability calculating unit may calculate an adjacent beat reliability and a successive beat reliability on the basis of the acoustic signal of which the onset is accentuated and the estimated beat interval, and calculate the beat time reliability on the basis of the calculation result.

According to another aspect of the invention, there is provided a beat tracking method including: a first step of performing a filtering process on an input acoustic signal and accentuating an onset; a second step of performing a time-frequency pattern matching process employing a mutual correlation function on the acoustic signal of which the onset is accentuated, and calculating a beat interval reliability; and a third step of estimating a beat interval on the basis of the calculated beat interval reliability.

The beat tracking method may further include: a fourth step of calculating a beat time reliability on the basis of the acoustic signal of which the onset is accentuated in the first step and the beat interval estimated in the third step; and a fifth step of estimating a beat time on the basis of the calculated beat time reliability.

In the beat tracking method, the fourth step may include calculating an adjacent beat reliability and a successive beat reliability on the basis of the acoustic signal of which the onset is accentuated and the estimated beat interval, and calculating the beat time reliability on the basis of the calculation result.

According to another aspect of the invention, there is provided a computer-readable recording medium having recorded thereon a beat tracking program for allowing a computer to perform: a first step of performing a filtering process on an input acoustic signal and accentuating an onset; a second step of performing a time-frequency pattern matching process employing a mutual correlation function on the acoustic signal of which the onset is accentuated, and calculating a beat interval reliability; and a third step of estimating a beat interval on the basis of the calculated beat interval reliability.

According to another aspect of the invention, there is provided a beat tracking program allowing a computer to perform: a first step of performing a filtering process on an input acoustic signal and accentuating an onset; a second step of performing a time-frequency pattern matching process employing a mutual correlation function on the acoustic signal of which the onset is accentuated, and calculating a beat interval reliability; and a third step of estimating a beat interval on the basis of the calculated beat interval reliability.

According to another aspect of the invention, there is provided a robot (e.g., the legged movable music robot 4 in an embodiment) including: a sound collecting unit (e.g., the ear functional unit 310 in an embodiment) configured to collect and to convert a musical sound into a musical acoustic signal (e.g., the musical acoustic signal MA in an embodiment); a voice signal generating unit (e.g., the singing controller 220 and the scat controller 230 in an embodiment) configured to generate a self-vocalized voice signal (e.g., the self-vocalized voice signal SV in an embodiment) by a voice synthesizing process; a sound outputting unit (e.g., the vocalization functional unit 320 in an embodiment) configured to convert the self-vocalized voice signal into a sound and to output that sound; a self-vocalized voice regulating unit (e.g., the self-vocalized sound regulator 10 in an embodiment) configured to receive the musical acoustic signal and the self-vocalized voice signal and to generate an acoustic signal acquired by removing a voice component of the self-vocalized voice signal from the musical acoustic signal; a filtering unit (e.g., the Sobel filter unit 21 in an embodiment) configured to perform a filtering process on the acoustic signal and accentuating an onset; a beat interval reliability calculating unit (the time-frequency pattern matching unit 22 in an embodiment) configured to perform a time-frequency pattern matching process employing a mutual correlation function on the acoustic signal of which the onset is accentuated and to calculate a beat interval reliability; a beat interval estimating unit (e.g., the beat interval estimator 23 in an embodiment) configured to estimate a beat interval (e.g., the tempo TP in an embodiment) on the basis of the calculated beat interval reliability; a beat time reliability calculating unit (e.g., the adjacent beat reliability calculator 31, the successive beat reliability calculator 32, and the beat time reliability calculator 33 in an embodiment) configured to calculate a beat time reliability on the basis of the acoustic signal of which the onset is accentuated by the filtering unit and the beat interval estimated by the beat interval estimating unit; a beat time estimating unit (e.g., the beat time estimator 34 in an embodiment) configured to estimate a beat time (e.g., the beat time BT in an embodiment) on the basis of the calculated beat time reliability; and a synchronization unit (e.g., the beat time predictor 210, the singing controller 220, and the scat controller 230 in an embodiment) configured to synchronize the self-vocalized voice signal generated from the voice signal generating unit on the basis of the estimated beat interval and the estimated beat time.

According to the above-mentioned configurations of the invention, it is possible to guarantee robustness with respect to noise, and to guarantee tempo variation following ability and the stability in tempo estimation.

According to the invention, since the pattern matching is achieved by applying a two-dimensional mutual correlation function in the time direction and the frequency direction, it is possible to reduce the process delay time while guaranteeing stability in processing noises.

According to the invention, since the onset is accentuated, it is possible to further improve the robustness of the beat component to the noises.

According to the invention, since the beat time reliability is calculated and the beat time is then estimated, it is possible to estimate the beat time with high precision based on the accuracy of the beat time.

According to the invention, since the adjacent beat reliability and the successive beat reliability are calculated and the beat time reliability is then calculated, it is possible to estimate the beat time of a beat train with high probability from a set of beats, thereby further enhancing the precision.

According to the invention, it is possible to guarantee robustness with respect to noises and to guarantee tempo variation following ability and the stability in tempo estimation, thereby making an interaction with the music.

BRIEF DESCRIPTION OF THE DRAWINGS

FIG. 2 is a diagram illustrating a beat interval estimating algorithm of determining an estimated beat interval according to the embodiment.

FIG. 3 is a diagram illustrating a beat time estimating algorithm of estimating a beat time according to the embodiment.

FIG. 7 is a diagram illustrating an example of a music ID table in the example.

FIG. 11 is a diagram illustrating a test result of the beat tracking ability (average delay time after a variation in tempo) in the example.

FIG. 13 is a diagram illustrating a test result of the beat tracking ability (beat predicting success rate) in the example.

DETAILED DESCRIPTION OF THE INVENTION

Hereinafter, an embodiment of the invention will be described in detail with reference to the accompanying drawings. Here, an example where a real-time beat tracking apparatus (hereinafter, referred to as "beat tracking apparatus") according to an embodiment of the invention is applied to a robot will be described. Although details of the robot will be described in examples to be described later, the robot interacts with the music by extracting beats from the music collected by a microphone and stepping in place to the beats or outputting self-vocalized sounds by singing or scatting from a speaker.

Figure 1:
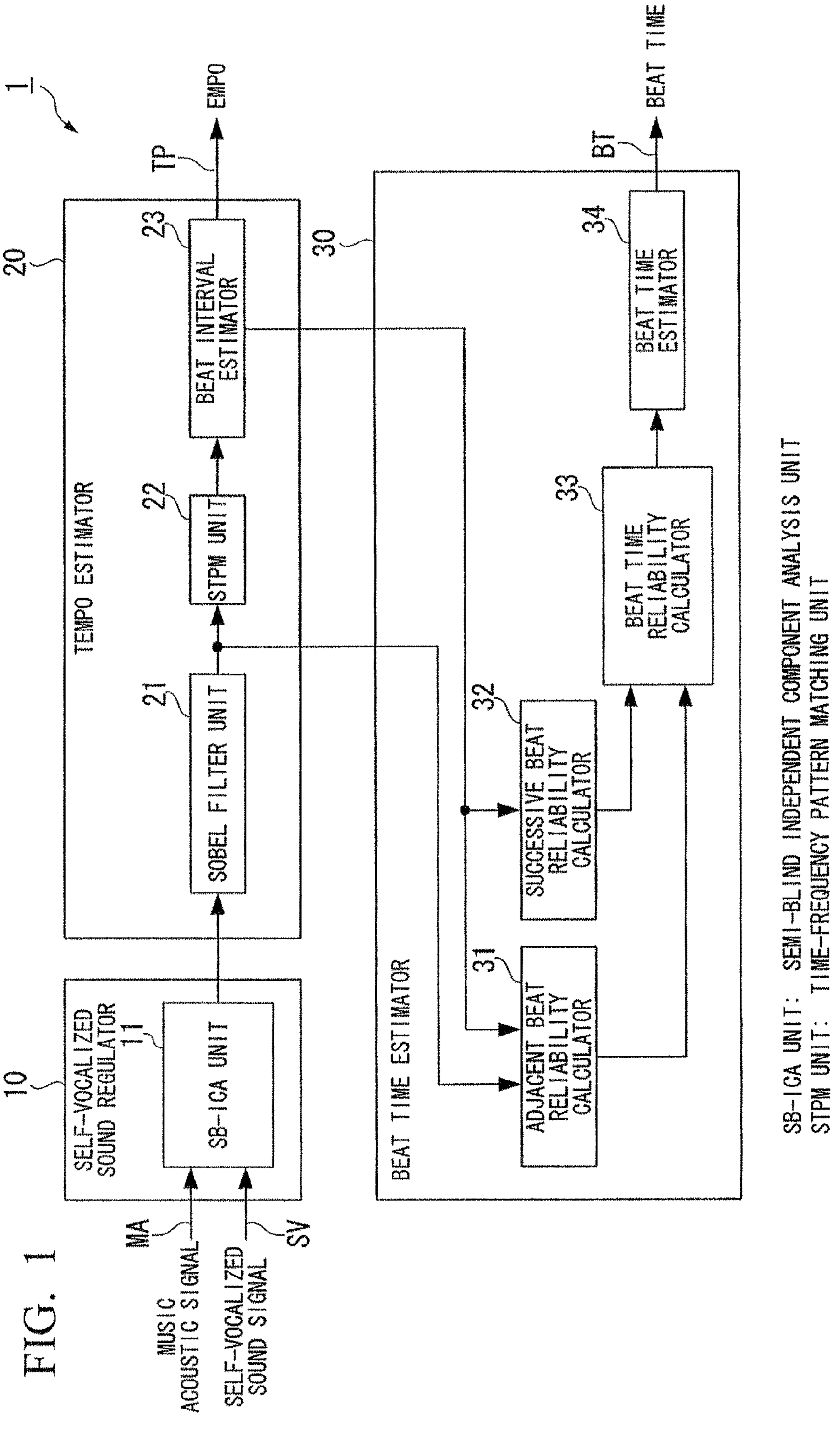
FIG. 1 is a block diagram illustrating a configuration of a beat tracking apparatus according to an embodiment of the invention.

FIG. 1 is a block diagram illustrating the configuration of the beat tracking apparatus according to the embodiment. In the drawing, the beat tracking apparatus 1 includes a self-vocalized sound regulator 10, a tempo estimator 20, and a beat time estimator 30.

The self-vocalized sound regulator 10 includes a semi-blind independent component analysis unit (hereinafter, referred to as SB-ICA unit) 11. Two-channel voice signals are input to the SB-ICA unit 11. The first channel is a musical acoustic signal MA and the second channel is a self-vocalized voice signal SV The musical acoustic signal MA is an acoustic signal acquired from the music collected by a microphone built in the robot. Here, the term music means an acoustic signal having beats, such as sung music, executed music, or scat. The self-vocalized voice signal SV is an acoustic signal associated with a voice-synthesized sound generated by a voice signal generator (for example, a singing controller and a scat controller in an example described later) of the robot which is input to an input unit of a speaker.

The self-vocalized voice signal SV is a voice signal generated by the voice signal generator of the robot and thus a clean signal is produced in which noises are sufficiently small. On the other hand, the musical acoustic signal MA is an acoustic signal collected by the microphone and thus includes noises. Particularly, when the robot is made to step in place, sing, scat, and the like while listening to the music, sounds accompanied with these operations serve as the noises having the same periodicity as the music which the robot is listening to and are thus included in the musical acoustic signal MA.

Therefore, the SB-ICA unit 11 receiving the musical acoustic signal MA and the self-vocalized voice signal SV, performs a frequency analysis process thereon, then cancels the echo of the self-vocalized voice component from the musical acoustic information, and outputs a self-vocalized sound regulated spectrum which is a spectrum where the self-vocalized sounds are regulated.

Specifically, the SB-ICA unit 11 synchronizes and samples the musical acoustic signal MA and the self-vocalized voice signal SV, for example, with 44.1 KHz and 16 bits and then performs a frequency analysis process employing a short-time Fourier transform in which the window length is set to 4096 points and the shift length is set to 512 points. The spectrums acquired from the first and second channels by this frequency analysis process are spectrums Y(t, ω) and S(t, ω). Here, t and ω are indexes indicating the time frame and the frequency.

Then, the SB-ICA unit 11 performs an SB-ICA process on the basis of the spectrums Y(t, ω) and S(t, ω) to acquire a self-vocalized sound regulated spectrum p(t, ω). The calculating method of the SB-ICA process is expressed by Equation (1). In Equation (1), ω is omitted for the purpose of simplifying the expression.

$$\begin{pmatrix} P(t) \\ S(t) \\ \vdots \\ S(t-M) \end{pmatrix} = \begin{pmatrix} A & W(0) & \dots & W(M) \\ 0 & 1 & \dots & 0 \\ \vdots & \vdots & \ddots & \vdots \\ 0 & 0 & \dots & 1 \end{pmatrix} \begin{pmatrix} Y(t) \\ S(t) \\ \vdots \\ S(t-M) \end{pmatrix} \quad \text{EQ. (1)}$$

In Equation (1), the number of frames for considering the echo is set to M. That is, it is assumed that the echo over the M frames is generated by a transmission system from the speaker to the microphone and reflection models of S(t, ω), S(t−1, ω), S(t−2, ω), . . . , and S(t-M, ω) are employed. For example, M=8 frames can be set in the test. A and W in Equation (1) represent a separation filter and are adaptively estimated by the SB-ICA unit 11. A spectrum satisfying p(t, ω)=Y(t, ω)−S(t, ω) is calculated by Equation (1).

Therefore, the SB-ICA unit 11 can regulate the self-vocalized sound with high precision while achieving a noise removing effect by using S(t, ω), which is the existing signal, as the input and the output of the SB-ICA process and considering the echo due to the transmission system.

The tempo estimator 20 includes a Sobel filter unit 21, a time-frequency pattern matching unit (hereinafter, referred to as STPM unit) 22, and a beat interval estimator 23 (STPM: Spectro-Temporal Pattern Matching).

The Sobel filter unit 21 is used in a process to be performed prior to a beat interval estimating process of the tempo estimator 20 and is a filter for accentuating an onset (portion where the level of the acoustic signal is suddenly raised) of the music in the self-vocalized sound regulated spectrum p(t, ω) supplied from the self-vocalized sound regulator 10. As a result, the robustness of the beat component to noise is improved.

Specifically, the Sobel filter unit 21 applies the mel filter bank used in a voice recognizing process or a music recognizing process to the self-vocalized regulated spectrum p(t, ω) and compresses the number of dimensions of the frequency to 64 dimensions. The acquired power spectrum in mel scales is represented by Pmel(t, f). The frequency index in the mel frequency axis is represented by f. Here, the time when the power suddenly rises in the spectrogram is often the onset of the music and the onset and the beat time or the tempo have a close relation. Therefore, the spectrums are shaped using the Sobel filter which can concurrently perform the edge accentuation in the time direction and the smoothing in the frequency direction. The calculation of the Sobel filter filtering the power spectrum Pmel(t, f) and outputting an output Psobel(t, f) is expressed by Equation (2).

$$\begin{aligned} P_{sobel}(t, f) = & -P_{mel}(t-1, f+1) + \\ & P_{mel}(t+1, f+1) - P_{mel}(t-1, f-1) + \\ & P_{mel}(t+1, f-1) - 2P_{mel}(t-1, f) + 2P_{mel}(t+1, f) \end{aligned} \quad \text{EQ. (2)}$$

To extract the rising part of the power corresponding to the beat time, the process of Equation (3) is performed to acquire a 62-dimension onset vector d(t, f) (where f=1, 2, . . . , and 62) in every frame.

$$d(t, f) = \begin{cases} P_{sobel}(t, f) & \text{if } P_{sobel}(t, f) > 0 \\ 0 & \text{otherwise} \end{cases} \quad \text{EQ. (3)}$$

The beat interval estimating process of the tempo estimator 20 is performed by the STPM unit 22 and the beat interval estimator 23. Here, the time interval between two adjacent beats is defined as a "beat interval." The STPM unit 22 performs a time-frequency pattern matching process with a normalizing mutual correlation function using the onset vector d(t, f) acquired by the Sobel filter 21 to calculate the beat interval reliability R(t, i). The calculation of the normalizing mutual correlation function is expressed by Equation (4). In Equation (4), the number of dimensions used to match the onset vectors is defined Fw. For example, 62 indicating all the 62 dimensions can be used as Fw. The matching window length is represented by Pw and the shift parameter is represented by i.

$$R(t, i) = \frac{\sum_{j=1}^{F_W} \sum_{k=0}^{P_W-1} d(t-k, j) d(t-i-k, j)}{\sqrt{\sum_{j=1}^{F_W} \sum_{k=0}^{P_W-1} d(t-k, j)^2 \sum_{j=1}^{F_W} \sum_{k=0}^{P_W-1} d(t-i-k, j)^2}} \quad \text{EQ. (4)}$$

Since the normalizing mutual correlation function shown in Equation (4) serves to take the mutual correlation in two dimensions of the time direction and the frequency direction, the window length in the time direction being deepened in the frequency direction can be reduced. That is, the STPM unit 22 can reduce the process delay time while guaranteeing of stability in processing noises. The normalization term described in the denominator of Equation (4) is a part corresponding to the whitening of the signal process. Therefore, the STPM unit 22 has a stationary noise regulating effect in addition to the noise regulating effect of the Sobel filter unit 21.

The beat interval estimator 23 estimates the beat interval from the beat interval reliability R(t, i) calculated by the STPM unit 22. Specifically, the beat interval is estimated as follows. The beat interval estimator 23 calculates local peaks Rpeak(t, i) using Equation (5) as pre-processing.

$$R_{peak}(t, i) = \begin{cases} R(t, i) & \text{if } R(t, i-1) < R(t, i) < R(t, i+1) \\ 0 & \text{otherwise} \end{cases} \quad \text{EQ. (5)}$$

The beat interval estimator 23 extracts two local peaks from the uppermost of the local peaks Rpeak(t, i) calculated by Equation (5). The beat interval i corresponding to the local peaks is selected as beat intervals I1(*t*) and I2(*t*) from the larger value of the local peaks Rpeak(t, i). The beat interval estimator 23 acquires beat interval candidates Ic(t) using the beat intervals I1(*t*) and I2(*t*) and further estimates the estimated beat interval I(t).

FIG. 2 shows a beat interval estimating algorithm for determining the estimated beat interval I(t), which will be specifically described. In the drawing, when the difference in reliability between two extracted local peaks Rpeak(t, i) is great, the beat interval I1(*t*) is set as the beat interval candidate Ic(t). The criterion of the difference is determined by a constant α and for example, the constant α can be set to 0.7.

On the other hand, when the difference is small, the upbeat may be extracted and thus the beat interval I1(*t*) may not be the beat interval to be acquired. Particularly, integer multiples (for example, 1/2, 2/1, 5/4, 3/4, 2/3, 4/3, and the like) of a positive integer value may be erroneously detected. Therefore, in consideration of this, the beat interval candidate Ic(t) is estimated using the difference between the beat intervals I1(*t*) and I2(*t*). More specifically, when the difference between the beat intervals I1(*t*) and I2(*t*) is a difference of Id(t) and the absolute value of I1(*t*)−n×Id(t) or the absolute value of I2(*t*)−n×Id(t) is smaller than a threshold value δ, n×Id(t) is determined as the beat interval candidate Ic(t). At this time, the determination is made in the range of an integer variable n from 2 to Nmax. Here, Nmax can be set to 4 in consideration of the length of a quarter note.

The same process as described above is performed using the acquired beat interval candidate Ic(t) and the beat interval I(t−1) of the previous frame to estimate the final estimated beat interval I(t).

The beat interval estimator 23 calculates the tempo TP=Im(t) by the use of Equation (6) as the mean value of the beat interval group of $T_I$ frames estimated in the beat interval estimating process. For example, $T_I$ may be 13 frames (about 150 ms).

$$I_m(t) = \text{median}(I)(t_i))(t_i = t, t-1, \ldots, t-T_I) \quad \text{EQ. (6)}$$

Referring to FIG. 1 again, the beat time estimator 30 includes an adjacent beat reliability calculator 31, a successive beat reliability calculator 32, a beat time reliability calculator 33, and a beat time estimator 34.

The adjacent beat reliability calculator 31 serves to calculate the reliability with which a certain frame and the frame prior by the beat interval I(t) to the certain frame are both beat times. Specifically, the reliability with which the frame t-i and the frame t-i-I(t) prior thereto by one beat interval I(t) are both the beat times, that is, the adjacent beat reliability Sc(t, t-i), is calculated by Equation (7) using the onset vector d(t, f) for each processing frame t.

$$S_c(t, t-i) = F_s(t-i) + F_s(t-i-I(t)) \quad (0 \le i \le I(t)) \qquad \text{EQ. (7)}$$

$$F_s(t) = \sum_{f=1}^{F_W} d(t, f)$$

The successive beat reliability calculator 32 serves to calculate the reliability indicating that beats successively exist with the estimated beat interval I(t) at each time. Specifically, the successive beat reliability Sr(t, t-i) of the frame t-i in the processing frame t is calculated by Equation (8) using the adjacent beat reliability Sc(t, t-i). Tp(t, m) represents the beat time prior to the frame t by m frames and Nsr represents the number of beats to be considered for estimating the successive beat reliability Sr(t, t-i).

$$S_r(t, t-i) = \sum_{m}^{N_{sr}} S_c(T_p(t, m), i) \quad (0 \le i \le I(t)) \qquad \text{EQ. (8)}$$

$$T_p(t, m) = \begin{cases} t & (m = 0) \\ T_p(t, m-1) - I(T_p(t, m-1)) & (m \ge 1) \end{cases}$$

The successive beat reliability Sr(t, t-i) is effectively used to determined which beat train can be most relied upon when plural beat trains are discovered.

The beat time reliability calculator 33 serves to calculate the beat time reliability S'(t, t-i) of the frame t-i in the processing frame t by the use of Equation (9) using the adjacent beat reliability Sc(t, t-i) and the successive beat reliability Sr(t, t-i).

$$S'(t,t-i)=S_c(t,t-i)S_r(t,t-i) \qquad \text{EQ. (9)}$$

Then, the beat time reliability calculator 33 calculates the final beat time reliability S(t) by performing the averaging expressed by Equation (10) in consideration of the temporal overlapping of the beat time reliabilities S'(t, t-i). S't(t) and Ns'(t) represent the set of S'(t, t-i) having the meaningful value in the frame t and the number of elements in the set.

$$S(t) = \frac{1}{N_{S'(t)}} \sum_{t_i \in S'_t(t)} S'(t_i, t) \qquad \text{EQ. (10)}$$

The beat time estimator 34 estimates the beat time BT using the beat time reliability S(t) calculated by the beat time reliability calculator 33. Specifically, a beat time estimating algorithm for estimating the beat time T(n+1) shown in FIG. 3 will be described now. In the beat time estimating algorithm of the drawing, it is assumed that the n-th beat time T(n) has been already acquired and the (n+1)-th beat time T(n+1) is estimated. In the beat time estimating algorithm of the drawing, when the current processing frame t exceeds the time acquired by adding 3/4 of the beat interval I(t) to the beat time T(n), three peaks at most are extracted from the beat time reliability S(t) in a range of T(n)±½·I(t). When a peak exists in the range (Np>0), the peak closest to T(n)+I(t) is set as the beat time T(n+1). On the other hand, when the peak does not exist, T(n)+I(t) is set as the beat time T(n+1). The beat time T(n+1) is output as the beat time BT.

In the above-mentioned beat tracking apparatus according to this embodiment, since the echo cancellation of the self-vocalized voice component from the musical acoustic information having been subjected to the frequency analysis process is performed by the self-vocalized sound regulator, the noise removing effect and the self-vocalized sound regulating effect can be achieved.

In the beat tracking apparatus according to this embodiment, since the Sobel filtering process is carried out on the musical acoustic information in which the self-vocalized sound is regulated, the onset of the music is accentuated, thereby improving the robustness of the beat components to the noise.

In the beat tracking apparatus according to this embodiment, since the two-dimensional normalization mutual correlation function in the time direction and the frequency direction is calculated to carry out the pattern matching, it is possible to reduce the process delay time while guaranteeing stability in processing the noises.

In the beat tracking apparatus according to this embodiment, since two beat intervals corresponding to the first and second highest local peaks are selected as the beat interval candidates and it is specifically determined which is suitable as the beat interval, it is possible to estimate the beat interval while suppressing the upbeat from being erroneously detected.

In the beat tracking apparatus according to this embodiment, since the adjacent beat reliability and the successive beat reliability are calculated and the beat time reliability is calculated, it is possible to estimate the beat time of the beat train with high probability from the set of beats.

EXAMPLES

Figure 4:
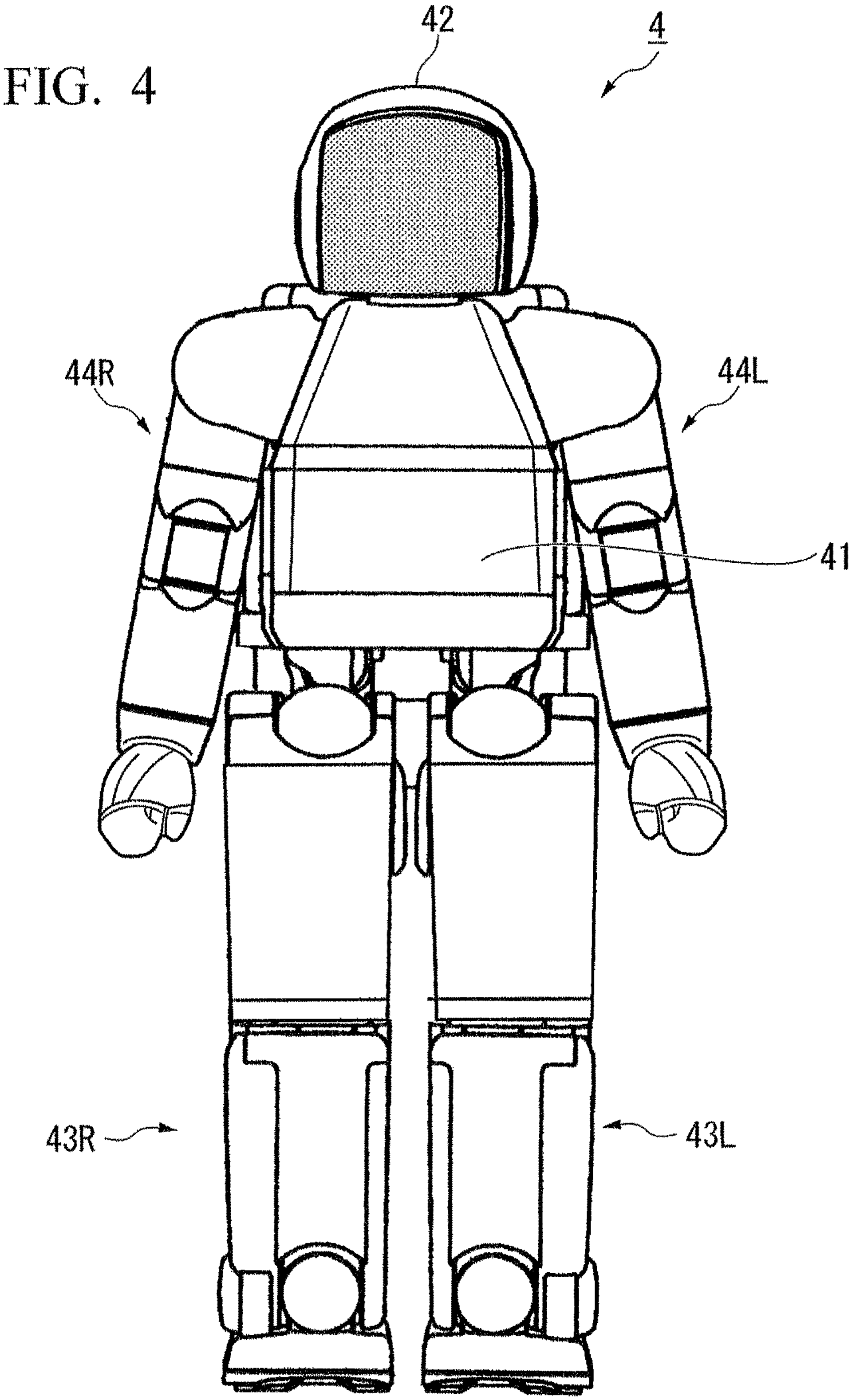
FIG. 4 is a front view schematically illustrating a legged movable music robot in an example of the invention.
Figure 5:
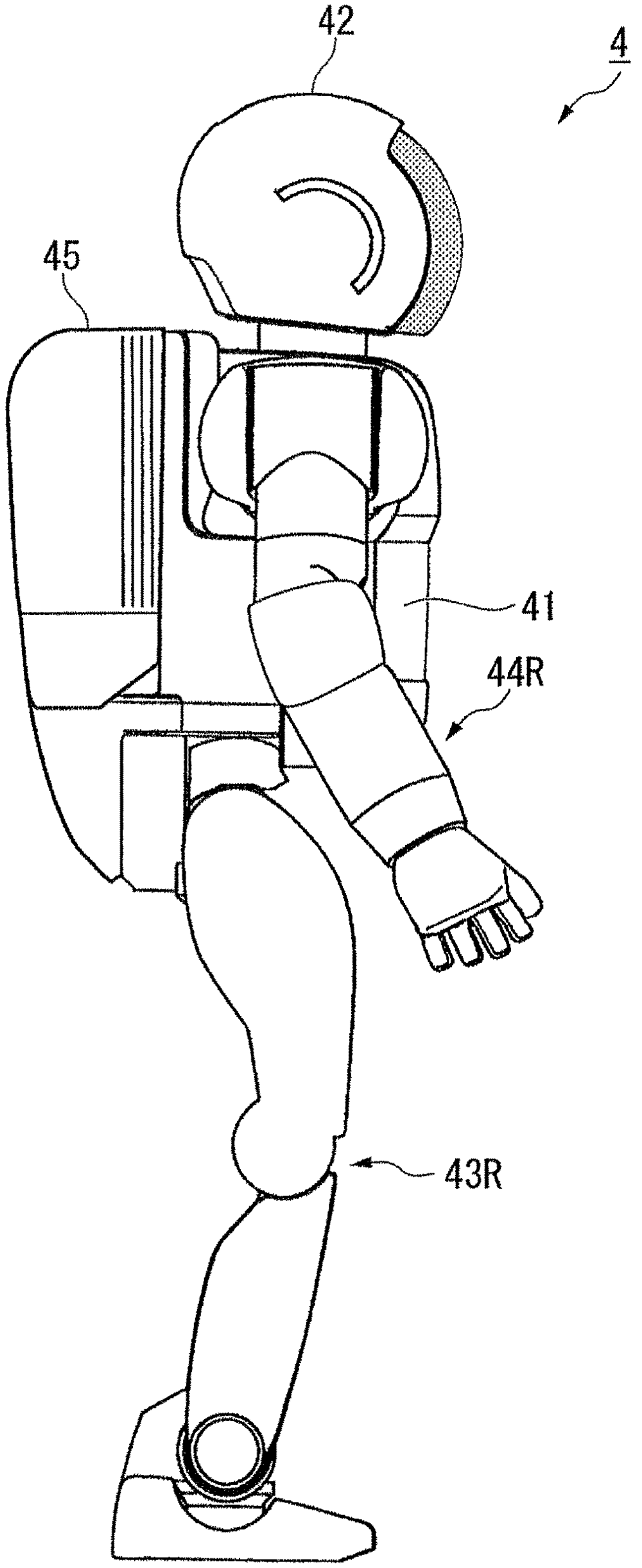
FIG. 5 is a side view schematically illustrating the legged movable music robot in the example.

Examples of the invention will be described now with reference to the accompanying drawings. FIG. 4 is a front view schematically illustrating a legged movable music robot (hereinafter, referred to as "music robot") according to an example of the invention. FIG. 5 is a side view schematically illustrating the music robot shown in FIG. 4. In FIG. 4, the music robot 4 includes a body part 41, a head part 42, leg parts 43L and 43R, and arm parts 44L and 44R movably connected to the body part. As shown in FIG. 5, the music robot 4 mounts a housing part 45 on the body part 41 as if it were carried on the robot's back.

Figure 6:
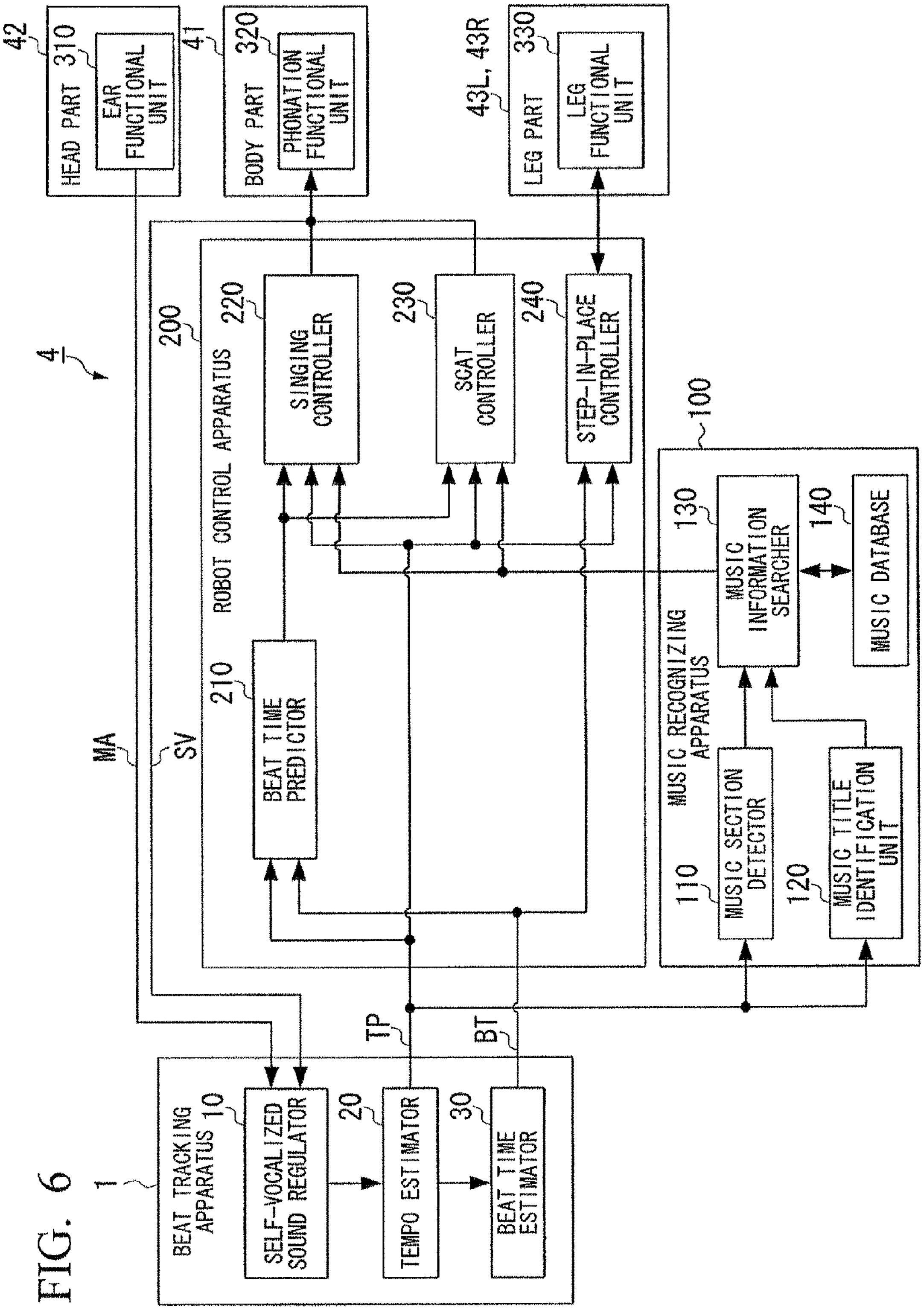
FIG. 6 is a block diagram illustrating a configuration of a part mainly involved in a music interaction of the legged movable music robot in the example.

FIG. 6 is a block diagram illustrating a configuration of units mainly involved in the music interaction of the music robot 4. In the drawing, the music robot 4 includes a beat tracking apparatus 1, a music recognizing apparatus 100, and a robot control apparatus 200. Here, since the beat tracking apparatus according to the above-mentioned embodiment is employed as the beat tracking apparatus 1, like reference numerals are used. The beat tracking apparatus 1, the music recognizing apparatus 100, and the robot control apparatus 200 are housed in the housing part 45.

The head part 42 of the music robot 4 includes an ear functional unit 310 for collecting sounds in the vicinity of the music robot 4. The ear functional unit 310 can employ, for example, a microphone. The body part 41 includes a vocalization function unit 320 for transmitting sounds vocalized by the music robot 4 to the surroundings. The vocalization functional unit 320 can employ, for example, an amplifier and a speaker for amplifying voice signals. The leg parts 43L and 43R include a leg functional unit 330. The leg functional unit 330 serves to control the operation of the leg parts 43L and 43R, such as supporting the upper half of the body with the leg parts 43L and 43R in order for the robot to be able to stand upright and step with both legs or step in place.

As described in the above-mentioned embodiment, the beat tracking apparatus 1 serves to extract musical acoustic information in which the influence of the self-vocalized sound vocalized by the music robot 4 is suppressed from the music acoustic signal acquired by the music robot 4 listening to the music and to estimate the tempo and the beat time from the musical acoustic information. The self-vocalized sound regulator 10 of the beat tracking apparatus 1 includes a voice signal input unit corresponding to two channels. The musical acoustic signal MA is input through the first channel from the ear functional unit 310 disposed in the head part 42. A branched signal (also referred to as self-vocalized voice signal SV) of the self-vocalized voice signal SV output from the robot control apparatus 200 and input to the vocalization functional unit 320 is input through the second channel.

The music recognizing apparatus 100 serves to determine the music to be sung by the music robot 4 on the basis of the tempo TP estimated by the beat tracking apparatus 1 and to output music information on the music to the robot control apparatus 200. The music recognizing apparatus 100 includes a music section detector 110, a music title identification unit 120, a music information searcher 130, and a music database 140.

The music section detector 110 serves to detect the time for acquiring a stable beat interval as a music section on the basis of the tempo TP supplied from the beat tracking apparatus 1 and to output a music section status signal in the music section. Specifically, the total number of frames satisfying the condition that the difference between the beat interval I(x) of the frame x and the beat interval I(t) of the current processing frame t is smaller than the allowable error α of the beat interval out of Aw frames in the past is represented by Nx. The beat interval stability S at this time is then calculated by Equation (11).

$$S = \frac{N_x}{A_w} \qquad \text{EQ. (11)}$$

For example, when the number of frames in the past is Aw=300 (corresponding to about 3.5 seconds) and the allowable error is α=5 (corresponding to 58 ms), a section in which the beat interval stability S is 0.8 or more is determined as the music section.

The music title identification unit 120 serves to output a music ID corresponding to the tempo closest to the tempo TP supplied from the beat tracking apparatus 1. In this embodiment, it is assumed that the respective music has a particular tempo. Specifically, the music title identification unit 120 has a music ID table 70 shown in FIG. 7 in advance. The music ID table 70 is table data in which music IDs corresponding to plural tempos from 60 M.M. to 120 M.M. and a music ID "IDunknown" used when any tempo is not matched (Unknown) are registered. In the example shown in the drawing, the music information corresponding to the music IDs ID001 to ID007 is stored in the music database 140. The unit of tempo "M.M." is a tempo mark indicating the number of quarter notes per minute.

The music title identification unit 120 searches the music ID table 70 for a tempo having the smallest tempo difference out of the tempos TP supplied from the beat tracking apparatus 1 and outputs the music ID correlated with the searched tempo when the difference between the searched tempo and the tempo TP is equal to or less than the allowable value β of the tempo difference. On the other hand, when the difference is greater than the allowable value β, "IDunknown" is output as the music ID.

When the music ID supplied from the music title identification unit 120 is not "IDunknown", the music information searcher 130 reads the music information from the music database 140 using the music ID as a key and outputs the read music information in synchronization with the music section status signal supplied from the music section detector 110. The music information includes, for example, word information and musical score information including type, length, and interval of sounds. The music information is stored in the music database 140 in correlation with the music IDs (ID001 to ID007) of the music ID table 70 or the same IDs as the music IDs.

On the other hand, when the music ID supplied from the music title identification unit 120 is "IDunknown", it means that the music information to be sung is not stored in the music database 140 and thus the music information searcher 130 outputs a scat command for instructing the music robot 4 to sing the scat in synchronization with the input music section status signal.

The robot control apparatus 200 serves to allow the robot to sing or scat or step in place synchronized with the beat time or an operation combined therewith on the basis of the tempo TP and the beat time BT estimated by the beat tracking apparatus 1 and the music information or the scat command supplied from the music recognizing apparatus 100. The robot control apparatus 200 includes a beat time predictor 210, a singing controller 220, a scat controller 230, and a step-in-place controller 240.

The beat time predictor 210 serves to predict the future beat time after the current time in consideration of the process delay time in the music robot 4 on the basis of the tempo TP and the beat time BT estimated by the beat tracking apparatus 1. The process delay in this example includes the process delay in the beat tracking apparatus 1 and the process delay in the robot control apparatus 200.

The process delay in the beat tracking apparatus 1 is associated with the process of calculating the beat time reliability S(t) expressed by Equation (10) and the process of estimating the beat time T(n+1) in the beat time estimating algorithm. That is, when the beat time reliability S(t) of the frame t is calculated using Equation (10), it needs to wait until all the frames ti are prepared. The maximum value of the frame ti is defined as t+max(I(ti)) but is 1 sec which is equal to the window length of the normalization mutual correlation function because the maximum value of I(ti) is the number of frames corresponding to 60 M.M. in view of the characteristic of the beat time estimating algorithm. In the beat time estimating process, the beat time reliability up to T(n)+3/2·I(t) is necessary for extracting the peak at t=T(n)+3/4·I(t). That is, it needs to wait for 3/4·I(t) after the beat time reliability of the frame t is acquired and thus the maximum value thereof is 0.75 sec.

In the beat tracking apparatus 1, since the M-frame delay in the self-vocalized sound regulator 10 and the one-frame delay in the Sobel filter unit 21 of the tempo estimator 20 occurs, a process delay time of about 2 sec occurs.

The process delay in the robot control apparatus 200 is mainly attributed to the voice synthesizing process in the singing controller 220.

Therefore, the beat time predictor 210 predicts the beat time after a time longer than the process delay time by extrapolating the beat interval time associated with the tempo TP to the newest beat time BT estimated by the beat time estimator 30.

Specifically, it is possible to predict the beat time by the use of Equation (12) as a first example. In Equation (12), the beat time T(n) is the newest beat time out of the beat times estimated up to the frame t. In Equation (12), the frame T' is closest to the frame t out of the frames corresponding to the future beat time after the frame t is calculated.

$$T' = \begin{cases} T_{tmp} & \text{if } T_{tmp} \geq \frac{3}{2} I_m(t) + t \\ T_{tmp} + I_m(t) & \text{otherwise} \end{cases} \quad \text{EQ. (12)}$$

$$T_{tmp} = T(n) + I_m(t) + (t - T(n)) - \{(t - T(n)) \bmod I_m(t)\}$$

Figure 8A:
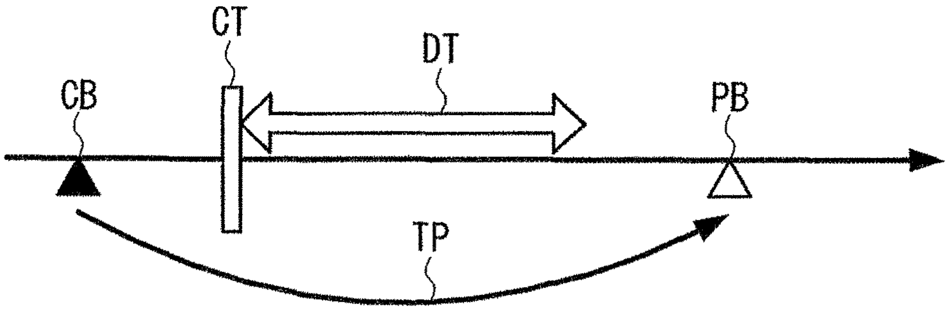
FIGS. 8A and 8B are diagrams schematically illustrating an operation of predicting and extrapolating a beat time on the basis of a beat interval time associated with an estimated tempo.
Figure 8B:
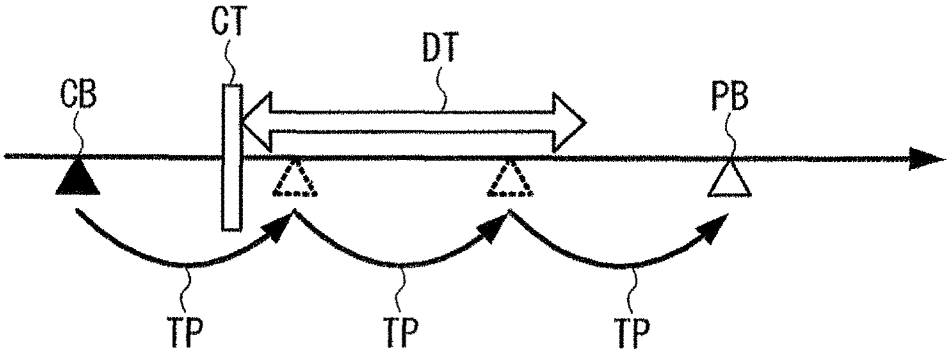

In a second example, when the process delay time is known in advance, the beat time predictor 210 counts the tempo TP until the process delay time passes from the current time and extrapolates the beat time when the process delay time has passed. FIGS. 8A and 8B are diagrams schematically illustrating the operation of extrapolating the beat time according to the second example. In FIGS. 8A and 8B, the beat time predictor 210 extrapolates the predicted beat time PB at the point of time when the process delay time DT passes from the current time CT after the newest beat time CB as the newest estimated beat time is acquired. FIG. 8A shows the operation of extrapolating the predicted beat time PB after a one beat interval because a one beat interval is longer than the process delay time DT. FIG. 8B shows the operation of extrapolating the predicted beat time PB after three beat intervals because a one beat interval is shorter than the process delay time DT.

The singing controller 220 adjusts the time and length of musical notes in the musical score in the music information supplied from the music information searcher 130 of the music recognizing apparatus 100, on the basis of the tempo TP estimated by the beat tracking apparatus 1 and the predicted beat time predicted by the beat time predictor 210. The singing controller 220 performs the voice synthesizing process using the word information from the music information, converts the synthesized voices into singing voice signals as voice signals, and outputs the singing voice signals.

When receiving the scat command supplied from the music information searcher 130 of the music recognizing apparatus 100, the scat controller 230 adjusts the vocalizing time of the scat words stored in advance such as "Daba Daba Duba" or "Zun Cha", on the basis of the tempo TP estimated by the beat tracking apparatus 1 and the predicted beat time PB predicted by the beat time predictor 210.

Specifically, the scat controller 230 sets the peaks of the sum value of the vector values of the onset vectors d(t, f) extracted from the scat words (for example, "Daba", "Daba", "Duba") as the scat beat times of "Daba", "Daba", and "Duba." The scat controller 230 performs the voice synthesizing process to match the scat beat times with the beat times of the sounds, converts the synthesized voices into scat voice signals as the voice signals, and outputs the scat voice signals.

The singing voice signals output from the singing controller 220 and the scat voice signals output from the scat controller 230 are synthesized and supplied to the vocalization functional unit 320 and are also supplied to the second channel of the self-vocalized sound controller 10 of the beat tracking apparatus 1. In the section where the music section status signal is output from the music section detector 110, the self-vocalized voice signal may be generated and output by signal synthesis.

The step-in-place controller 240 generates the time of the step-in-place operation on the basis of the tempo TP estimated by the beat tracking apparatus 1, the predicted beat time PB predicted by the beat time predictor 210, and the feedback rule using the contact time of the foot parts, at the end of the leg parts 43L and 43R of the music robot 4, with the ground.

Test results of the music interaction using the music robot 4 according to this example will be described now.

Test 1: Basic Performance of Beat Tracking 100 popular music songs (music songs with Japanese words and English words) in a popular music data base (RWC-MDB-P-2001) in an RWC study music database (http://staff.aist.go.jp/m.goto/RWC-MDB/) were used as test data for Test 1. The music songs were generated using MIDI data to easily acquire the correct beat times. However, the MIDI data was used only to evaluate the acquired beat times. The music songs of 60 seconds out of 30 to 90 seconds after the respective songs are started were used as the test data and beat tracking success rates of a method based on the mutual correlation function and a method based on the self correlation function in the music robot 4 according to this example were compared. In calculating the beat tracking success rates, it was determined as successful when the difference between the estimated beat time and the correct beat time was in a range of ±100 ms. A specific calculation example of the beat tracking success rate r is expressed by Equation (13). $N_{success}$ represents the number of successfully-estimated beats and $N_{total}$ represents the total number of correct beats.

$$r = \frac{N_{success}}{N_{total}} \times 100 \quad \text{EQ. (13)}$$

Test 2: Tempo Variation Following Rate

Three music songs actually performed and recorded were selected from the popular music database (RWC-MDB-P-2001) as the test data for Test 2 and the musical acoustic signals including a tempo variation were produced. Specifically, music songs of music numbers 11, 18, and 62 were selected (the tempos of which are 90, 112, and 81 M.M.), the music songs were divided and woven by 60 seconds in the order from No. 18 to No. 11 and to No. 62 and the musical acoustic information of four minutes was prepared. The beat tracking delays of this example and the method based on the self correlation function were compared using the musical acoustic information, similarly to Test 1. The beat tracking delay time was defined by the time it takes until the system follows the tempo variation after the tempo actually varies.

Test 3: Noise-Robust Performance of Beat Prediction

Music songs having a constant tempo and being generated using MIDI data of music number 62 in the popular music database (RWC-MDB-P-2001) were used as the test data for Test 3. Similarly to Test 1, the MIDI data was used only to evaluate the beat times. The beat tracking success rate was used as an evaluation indicator.

Figure 9:
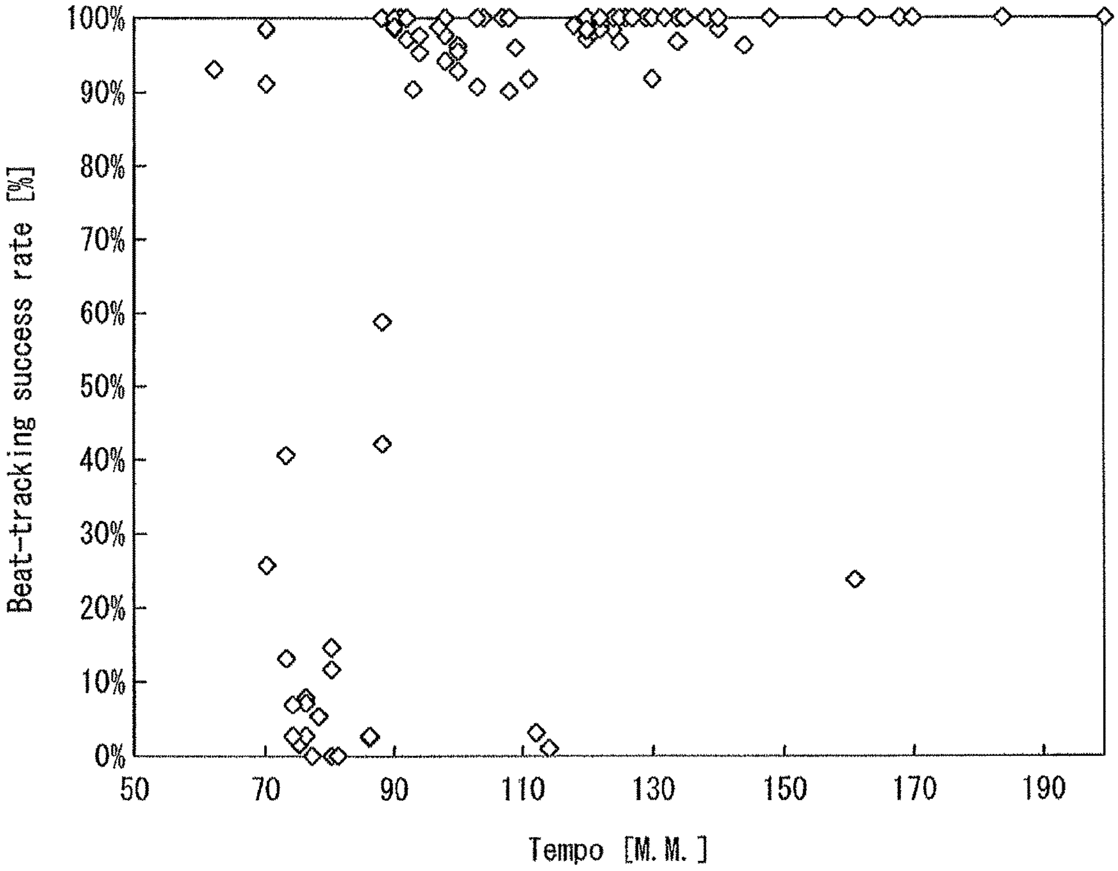
FIG. 9 is a diagram illustrating a test result of the beat tracking ability (beat tracking success rate) in the example.
Figure 10:
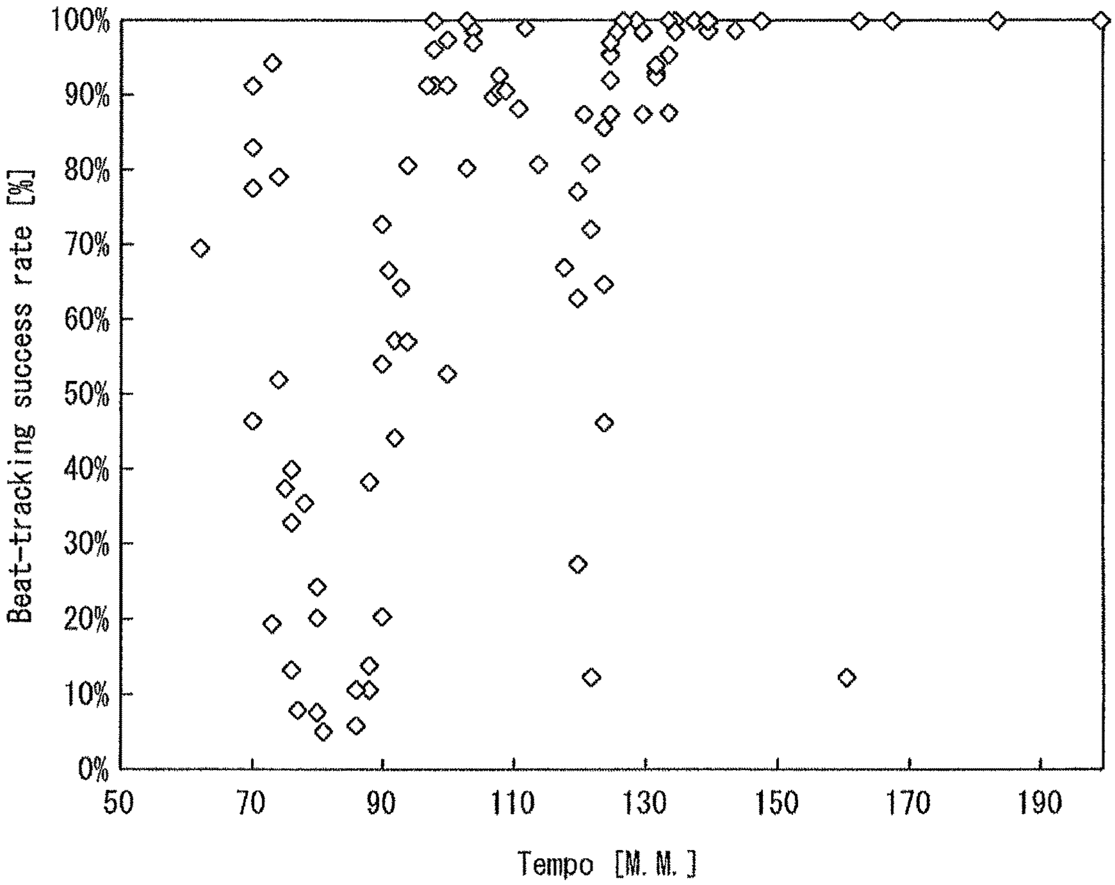
FIG. 10 is a diagram illustrating a test result of the beat tracking ability (beat tracking success rate) using the previously known technique.

The test results of Tests 1 to 3 will be described now. First, the result of Test 1 is shown in the diagrams of FIGS. 9 and 10. FIG. 9 shows the test result indicating the beat tracking success rate for the tempos in this example. FIG. 10 shows the equivalent test result in the method based on the self correlation function. In FIGS. 9 and 10, the average of the beat tracking success rates is about 79.5% in FIG. 9 and about 72.8% in FIG. 10, which shows that the method used in this example is much better than the method based on the self correlation function.

FIGS. 9 and 10 both show that the beat tracking success rate is low when the tempo is slow. It is guessed that this is because musical songs having slow tempos tend to be pieces of music constructed from fewer musical instruments, and instruments such as drums can be key in extracting the tempo. However, the beat tracking success rate in this example for the music songs with a tempo greater than about 90 M.M. is 90% or more, which shows that the basic performance of the beat tracking according to this example is higher than in the past example.

Figure 12:
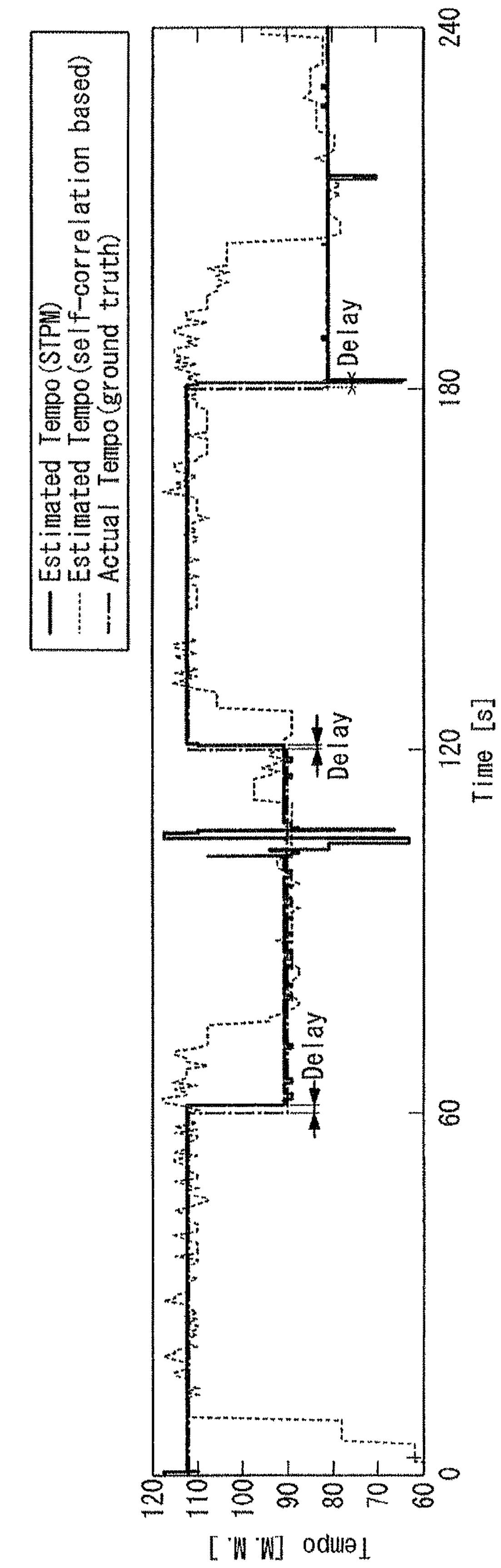
FIG. 12 is a graph illustrating a test result of the tempo estimation in the example.

The result of Test 2 is shown in the measurement result of the average delay time of FIG. 11. In FIG. 12, the test result of the tempo estimation when the music robot 4 is turned off is shown in a graph. As can be clearly known from FIGS. 11 and 12, the adaptation to the tempo variation in this example is faster than that in the past method based on the self correlation function. Referring to FIG. 11, this example (STPM process) has a time reducing effect of about 1/10 of the method based on the self correlation function (self correlation process) when the scat is not performed and has the time reducing effect of about 1/20 when the scat is performed.

Referring to FIG. 12, the delay time of this example for the actual tempo is Delay=2 sec, while the delay time of the method based on the self correlation function is Delay=about 20 sec. The beat tracking is distracted in the vicinity of 100 sec in the drawing, which is because a portion having no onset at the beat times temporarily exists in the test data. Therefore, the tempo may be temporarily (for a short time) unstable in this example, but the unstable period of time is much shorter than that in the past method based on the self correlation function. In this example, since the music section detector 110 of the music recognizing apparatus 100 detects the music sections and determines the section from which the beats cannot be extracted as a non-music section, the influence of the unstable period is very small in the music robot 4 according to this example.

The result of Test 3 is shown in a beat prediction success rate of FIG. 13. Referring to the drawing, it can be seen that the self-vocalized sounds have an influence on the beat tracking due to the periodicity and the fact that the self-vocalized sound regulating function effectively acts on periodic noises.

Since the music robot according to this example includes the above-mentioned beat tracking apparatus, it is possible to guarantee robustness with respect to noise and to have both the tempo variation following ability and the stability in tempo estimation.

In the music robot according to the example, since a future beat time is predicted from the estimated beat time in consideration of the process delay time, it is possible to make a musical interaction in real time.

Partial or entire functions of the beat tracking apparatus according to the above-mentioned embodiment may be embodied by a computer. In this case, the functions may be embodied by recording a beat tracking program for embodying the functions in a computer-readable recording medium and allowing a computer system to read and execute the beat tracking program recorded in the recording medium. Here, the "computer system" includes an OS (Operating System) or hardware of peripheral devices. The "computer-readable recording medium" means a portable recording medium such as a flexible disk, a magneto-optical disk, an optical disk, and a memory card or a memory device such as a hard disk built in the computer system. The "computer-readable recording medium" may include a medium dynamically storing programs for a short period of time like a communication line when programs are transmitted via a network such as the Internet or a communication circuit such as a telephone circuit, or a medium storing programs for a predetermined time like a volatile memory in the computer system serving as a server or a client in that case. The program may be used to embody a part of the above-mentioned functions or may be used to embody the above-mentioned functions by combination with programs recorded in advance in the computer system.

Although the embodiments of the invention have been described in detail with reference to the accompanying drawings, the specific configuration is not limited to the embodiments, but may include designs not departing from the gist of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A beat tracking apparatus comprising:

an electronic device comprising:

- a filtering unit configured to determine and accentuate an onset of an input acoustic signal;
- a beat interval reliability calculating unit configured to perform a time-frequency pattern matching process employing a mutual correlation function on the input acoustic signal of which the onset is accentuated and to calculate a beat interval reliability of the input acoustic signal; and
- a beat interval estimating unit configured to estimate a beat interval on the basis of the calculated beat interval reliability.

2. The beat tracking apparatus according to claim 1, wherein the filtering unit is a Sobel filter.

3. The beat tracking apparatus according to claim 1, wherein the electronic device further comprises:

- a beat time reliability calculating unit configured to calculate a beat time reliability on the basis of the input acoustic signal of which the onset is accentuated by the filtering unit and the beat interval estimated by the beat interval estimating unit; and
- a beat time estimating unit configured to estimate a beat time on the basis of the calculated beat time reliability.

4. The beat tracking apparatus according to claim 3, wherein the beat time reliability calculating unit configured to calculate an adjacent beat reliability and a successive beat reliability on the basis of the input acoustic signal of which the onset is accentuated and the estimated beat interval and calculates the beat time reliability on the basis of the calculation result.

5. A beat tracking method comprising:

performing, by a processor,

- a first step of determining and accentuating an onset of an input acoustic signal;
- a second step of performing a time-frequency pattern matching process employing a mutual correlation function on the input acoustic signal of which the onset is accentuated, and calculating a beat interval reliability of the input acoustic signal; and
- a third step of estimating a beat interval on the basis of the calculated beat interval reliability.

6. The beat tracking method according to claim 5, further comprising performing, by the processor:

- a fourth step of calculating a beat time reliability on the basis of the input acoustic signal of which the onset is accentuated in the first step and the beat interval estimated in the third step; and
- a fifth step of estimating a beat time on the basis of the calculated beat time reliability.

7. The beat tracking method according to claim 6, wherein the fourth step includes calculating an adjacent beat reliability and a successive beat reliability on the basis of the input acoustic signal of which the onset is accentuated and the estimated beat interval and calculating the beat time reliability on the basis of the calculation result.

8. A non-transitory computer-readable recording medium having recorded thereon a beat tracking program for allowing a computer to perform:

a first step of determining and accentuating an onset of an input acoustic signal;

a second step of performing a time-frequency pattern matching process employing a mutual correlation function on the input acoustic signal of which the onset is accentuated, and calculating a beat interval reliability; and a third step of estimating a beat interval on the basis of the calculated beat interval reliability.

9. A beat tracking program allowing a computer to perform:

a first step of determining and accentuating an onset of an input acoustic signal;

a second step of performing a time-frequency pattern matching process employing a mutual correlation function on the input acoustic signal of which the onset is accentuated, and calculating a beat interval reliability; and a third step of estimating a beat interval on the basis of the calculated beat interval reliability.

* * * * *